F. H. SHEPARD.
MEASURING SYSTEM.
APPLICATION FILED JULY 10, 1918.

1,401,654.

Patented Dec. 27, 1921.

WITNESSES:
H. B. Funk.
J. H. Procter

INVENTOR
Francis H. Shepard.
BY
Wesley G. Carr
ATTORNEY

UNITED STATES PATENT OFFICE.

FRANCIS H. SHEPARD, OF NEW ROCHELLE, NEW YORK, ASSIGNOR TO WESTINGHOUSE ELECTRIC & MANUFACTURING COMPANY, A CORPORATION OF PENNSYLVANIA.

MEASURING SYSTEM.

1,401,654.     Specification of Letters Patent.     Patented Dec. 27, 1921.

Application filed July 10, 1918. Serial No. 244,208.

*To all whom it may concern:*

Be it known that I, FRANCIS H. SHEPARD, a citizen of the United States, and a resident of New Rochelle, in the county of Westchester and State of New York, have invented a new and useful Improvement in Measuring Systems, of which the following is a specification.

My invention relates to measuring systems and particularly to frequency-indicating devices.

One object of my invention is to provide a frequency meter that shall have means whereby the indications are amplified to facilitate the observation of relatively small changes in frequency.

Another object of my invention is to provide means responsive to a quantity to be measured for so influencing a current-responsive device that the indications of the device vary substantially in accordance with the third power of the quantity to be measured.

A further object of my invention is to provide a device of the above-indicated character that shall be simple and inexpensive to construct and effective in its operation.

In practising my invention, I provide a motor responsive to the quantity to be measured and a direct-current compound-wound generator. The motor is adapted to drive the generator, and a voltmeter is provided for indicating the potential generated by the generator. If the normal speed of operation of the motor causes a predetermined voltage to be generated by the generator, this value of voltage, as indicated by the voltmeter, may correspond to the initial indication of the voltmeter and, since, when the speed of the motor changes, the change in voltage generated by the generator is substantially proportional to the third power of the change in speed, the indication of the voltmeter will be so amplified as to facilitate observing small changes in the quantity to be measured.

Figure 1:
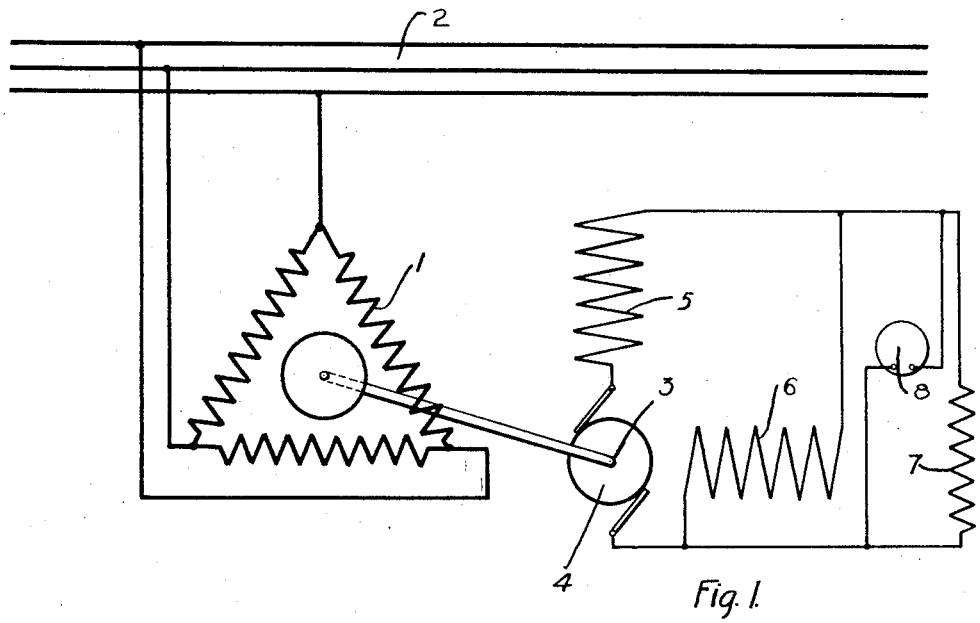
Figure 2:
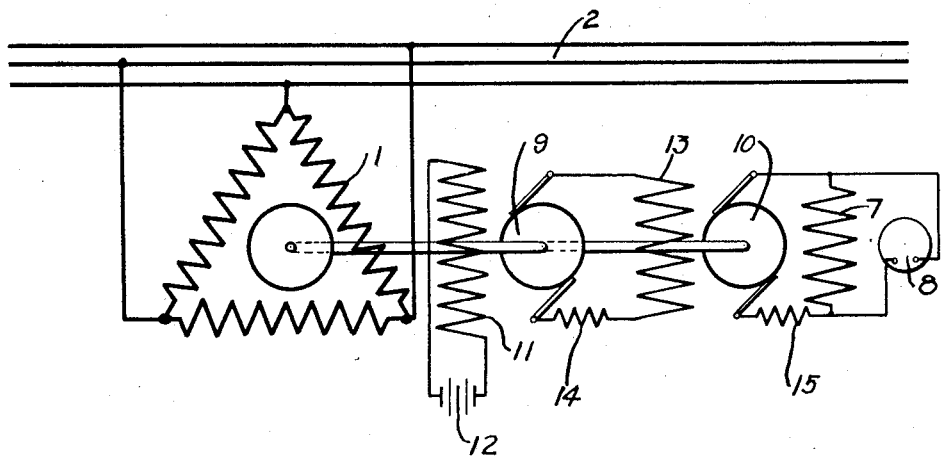

Figure 1 of the accompanying drawing is a diagrammatic view of a frequency-measuring system embodying my invention, and Fig. 2 is a diagrammatic view of a modified form of measuring system embodying my invention.

The stator winding of an induction motor 1 is operatively connected to a circuit 2, the frequency of which is to be indicated. The rotor of the motor 1 is mechanically connected to the armature 3 of a direct-current compound-wound generator 4 having a series field winding 5 and a shunt field winding 6.

A resistor 7 is connected in series with the armature of the generator 4 and the field winding 5, and a measuring instrument, such as a voltmeter 8, is connected in shunt relation to the resistor.

Since an induction motor having a constant slip varies in speed in accordance with the frequency of the circuit to which it is connected, under normal conditions of frequency, the motor 1 will cause the generator 4 to generate a predetermined voltage that may be indicated by the voltmeter 8. If the frequency of the circuit 2 increases, the speed of the motor 1 will increase a corresponding amount and the generator 4 will increase in voltage. However, this increase in voltage will increase the excitation of the field winding 6 and this, in turn, will cause a relatively larger current to traverse the field winding 5 and thus, upon each change in speed of the generator 4, the current generated thereby will be amplified substantially three fold. In other words, the changes, as indicated by the voltmeter 8, will vary substantially as the cube of the change in the speed of the motor 1 and, consequently, the cube of the change in frequency of the circuit 2.

A device of this character is relatively sensitive in its operation and permits relatively small variations in frequency to be observed. The motor and generator, of course, may be of relatively small capacity, and it is advisable that the generator 4 be saturated to a predetermined degree to prevent unstable operation thereof. However, if the generator is saturated the indications will not vary directly as the third power but substantially as such. It will be understood that, if the synchronous motor is used, instead of an induction motor, no account need be taken of the slip of the motor in the calibration of the voltmeter.

If it is desired to obtain indications that vary directly as the third power and still not subject the generator to unstable operation, it is necessary to utilize two unsaturated generators 9 and 10, as shown in Fig. 2. The shunt field winding 11 of one generator 9 is connected to a constant source 12 of electromotive force, and the shunt field winding 13 of the generator 10 is operatively connected to the armature and the series field winding 14 of the generator 9. The armature of the generator 10 is connected in circuit with its series field winding 15 and the resistor 7, and the voltmeter 8 is provided for indicating the voltage generated by the generator 10.

With the arrangement shown in Fig. 2, stable operation may be obtained because of the stabilizing action of the constant excitation of the winding 11 and, since the field magnets of the generators are unsaturated, the change in voltage generated by the generator 10 will vary directly as the change in speed.

My invention is not limited to the particular application set forth, as it may be applied to the measurement of various quantities without departing from the spirit and scope of the invention, as set forth in the appended claims.

I claim as my invention:

1. In an alternating-current electric circuit, the combination with a motor operatively connected to the circuit, of a plurality of direct-current generators mechanically connected to the motor and having the field winding of each generator connected across the armature of the preceding generator, means for energizing the field winding of the first generator and means for indicating the variation in current generated by the last generator.

2. A measuring system comprising a direct-current compound-wound generator actuated in accordance with a speed to be measured, means for electrically magnifying the speed effect, and means for indicating the current generated by the generator.

3. A measuring system comprising a compound-wound generator responsive to a speed to be measured, means for electrically magnifying the speed effect and a current-measuring instrument operatively connected to the generator.

4. A measuring system comprising a motor, a plurality of direct-current generators mechanically connected thereto, each generator energizing the following generator, means for energizing the first generator and means for indicating the voltage generated by the last generator.

5. A frequency-measuring system comprising a motor responsive to changes in frequency, a direct-current ammeter and means actuated by the motor for influencing the ammeter in accordance with the third power of the changes in speed of the motor.

6. A measuring system comprising means the speed of which varies in accordance with a frequency to be measured, an ammeter and means actuated by the speed-responsive means for influencing the ammeter in accordance with the third power of the change in speed of the speed-responsive means.

7. A measuring system comprising means the speed of which varies in accordance with a frequency to be measured, an ammeter and a compound-wound generator actuated by the speed-responsive means for influencing the ammeter in accordance with the third power of the change in speed of the speed-responsive means.

8. A measuring system comprising an induction motor, an ammeter and means actuated by the motor for influencing the ammeter in accordance with the third power of the change in speed of the motor.

9. A measuring system comprising an induction motor, a current-responsive device and means actuated by the motor for influencing the current-responsive device in accordance with a power higher than the first power of the change in speed of the motor.

10. The method of magnifying an effect to be measured, which consists in driving a plurality of compound-wound generators at a speed proportional to the effect, independently energizing one generator and then severally energizing the remaining generators from the preceding generator, and measuring the voltage generated by the end generator.

11. A measuring system for magnifying variations in the speed of a device, comprising a plurality of compound-wound generators actuated by the device, means for energizing one generator, the remaining generators being severally energized by the preceding generator, and indicating means responsive to the voltage of the end generator.

In testimony whereof I have hereunto subscribed my name this 1st day of July, 1918.

FRANCIS H. SHEPARD.